June 17, 1947.  J. W. SYMONDS  2,422,268
COAL TRUCK AND UNLOADING APPARATUS
Filed Oct. 9, 1944   2 Sheets-Sheet 1
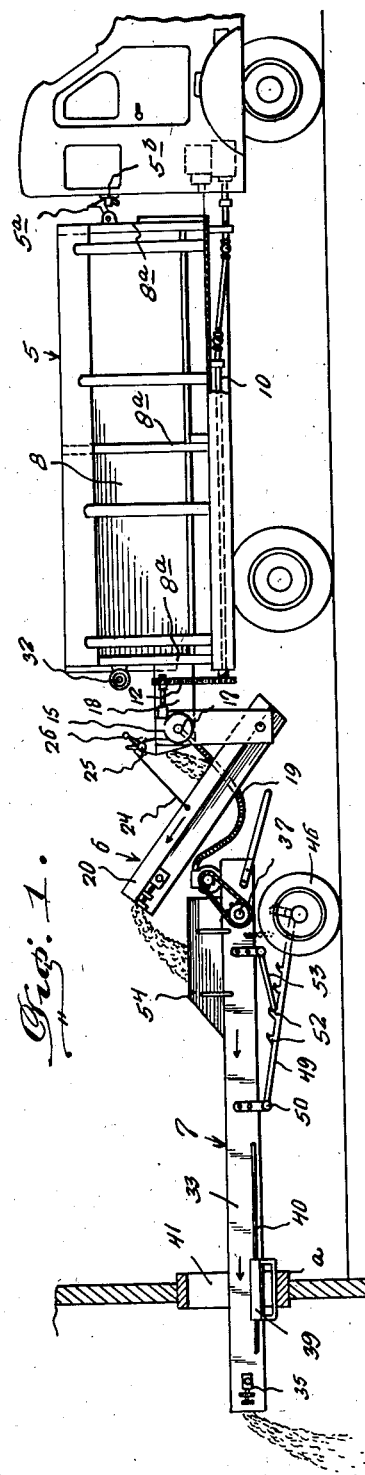
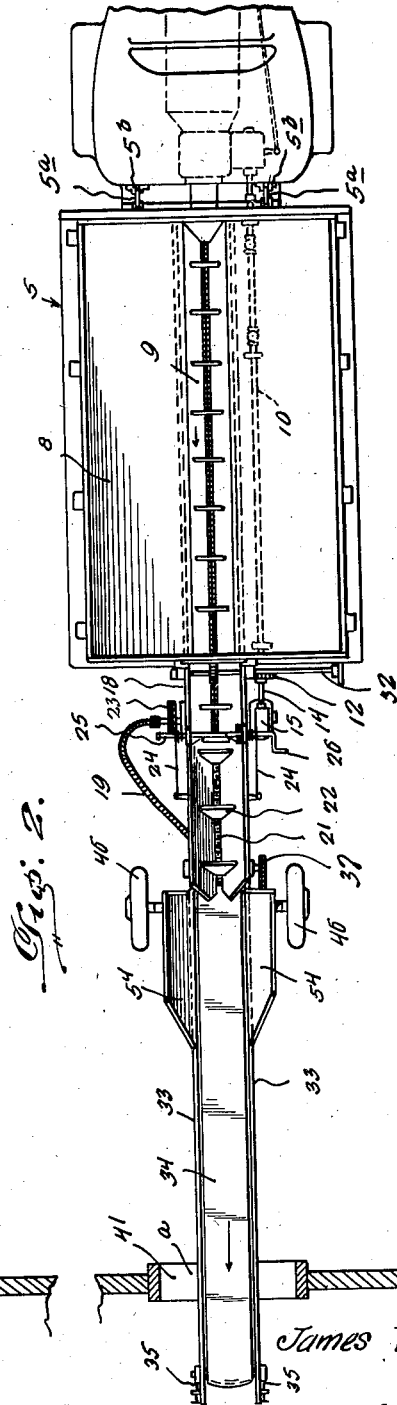
Inventor
James W. Symonds,
By McMorrow & Berman
Attorneys June 17, 1947.    J. W. SYMONDS    2,422,268
COAL TRUCK AND UNLOADING APPARATUS
Filed Oct. 9, 1944    2 Sheets-Sheet 2
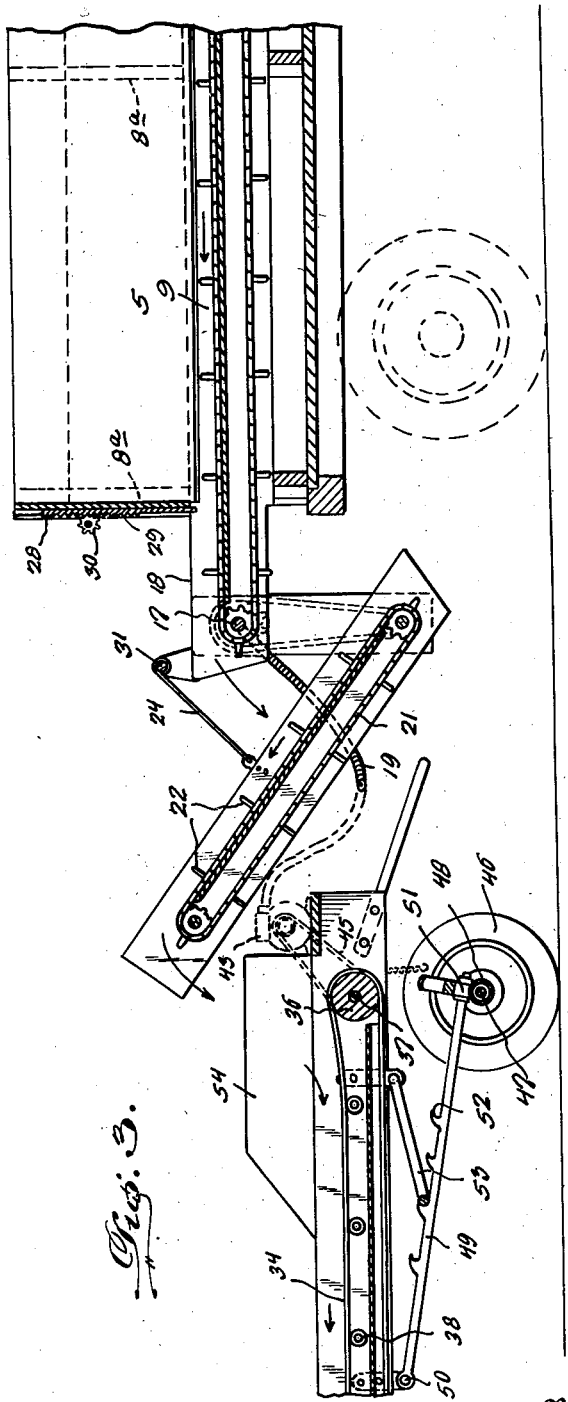
Inventor
James W. Symonds.
By McMarrou and Brman
Attorneys Patented June 17, 1947

2,422,268

UNITED STATES PATENT OFFICE 2,422,268

COAL TRUCK AND UNLOADING APPARATUS

James W. Symonds, Ladoga, Ind.

Application October 9, 1944, Serial No. 557,823

2 Claims. (Cl. 214—83)

This invention relates to new and useful improvements in vehicle unloading apparatus and more particularly to a special truck and unloading apparatus for unloading material in a quick and labor-saving manner of any material such as coal from the truck to the bin or coal pile, whether it be outside or in the basement of a building.

An important object is to provide an unloading apparatus which can be quickly applied to a truck for the conveyance of coal or other materials from the truck to a bin or other deposit location.

Other objects and advantages of the invention will become apparent to the reader of the following description.

In the drawings:

Figure 1 represents a side elevational view of the truck and unloading apparatus shown depositing coal into a bin through the wall of a building.

Figure 2 is a top plan view of the structure shown in Figure 1.

Figure 3 is a fragmentary enlarged longitudinal sectional view through the truck and unloading apparatus.

Figure 4 is a rear elevational view of the structure.

Figure 5 is a front elevational view of the conveyor.

Referring to the drawings wherein like numerals designate like parts, it can be seen in Figure 1, that numeral 5 generally refers to the improved truck. The unloading apparatus consists of an elevator generally referred to by numeral 6 and a conveyor generally referred to by numeral 7.

The truck has a body in which sloping side walls 8 lead down to a rearwardly movable conveyor 9. Under the body is a drive shaft 10 from the transmission of the truck to the rear of the chassis, where a sprocket wheel 11 drives a chain 12 to a sprocket wheel 13 on a shaft 14 which extends into a gear housing 15 where it is provided with a worm meshing with a gear 16 located on a shaft 17 passing through a side wall 18 of the conveyor 9 and serves to drive the conveyor 9.

The other end of the shaft 17 has a detachable flexible drive shaft 19 which extends to the conveyor 7.

The elevator 6 consists of an elongated trough 20 having an elevating chain 21 and cleats 22 carried thereby, the lower end of this chain being provided with a shaft driven by sprocket wheels and a sprocket chain 23 from the shaft 17.

The inclination of the elevator 6 can be changed by cables 24 extending from the wall 28 of the elevator to a shaft 25 mounted on the walls 18 and provided with a crank handle 26 and detent means 27. As is apparent in Figure 1, the elevator 6 can be carried by the truck 5 permanently.

As shown in Figure 3, the rear of the truck 5 has a vertically movable gate 28 on which is a rack 29. A gear 30 meshes with the rack 29, the gear being located on a shaft 31 operated by a hand wheel 32 at one side of the truck. The gate serves to close off the rear end of the conveyor to prevent displacement of coal until such time as unloading operation is to commence.

The conveyor 7 serves to catch coal or other material from the elevator 6 and deliver the same to a coal bin or deposit point.

The conveyor 7 consists of side walls 33, 33 between which an elongated belt conveyor 34 travels, the usual roll at one end having adjusting means 35, while the roll at the other end denoted by numeral 36 is on a shaft 37. It is preferable that the belt 34 have its upper flight ride on rollers 38 in order to satisfactorily support the load.

A rest 39 is provided for the discharge end of the conveyor 7, the same being adjustable on side rails 40 located on the outer sides of the side walls 33. These rests 39 are to be adjusted along the rails 40 so that they will sit on the sill *a* of a wall opening 41 when the discharge end of the conveyor has been inserted therethrough.

The aforementioned flexible drive shaft 19 extends from the shaft 17 to a gear housing 43 in order to drive a shaft 44. This shaft 44 is provided with a sprocket wheel driving a sprocket chain 45, which in turn drives the shaft 37 of the conveyor 7.

The conveyor 7 has a pair of carrier wheels 46 on an axle 47 over which is a housing 48. Elongated arms 49 extending from pivot points 50 under the intermediate portion of the conveyor 7 are connected to the housing 48, as at 51, and on the arms 49 are lugs 52 selectively engaged by a swingable U-shaped frame or brace 53 in order to support the wheeled end of the conveyor 7 at the proper elevation comparative to the height at which the discharge end is supported by the rests 39.

As can be seen in Figures 1, 2 and 3, the side walls 33 of the conveyor 7 have risers 54 so that no coal or other material is lost in being transferred from the elevator 6 to the conveyor 7.

It can now be seen, that while the elevator 6 is preferably carried by the truck, the conveyor 7 is a separate unit and can be reversed from its position in Figure 1 and dragged by the truck when being moved to a loading or unloading point.

Obviously, the drive shaft 10 drives the conveyor 9 and the coal or other material is fed from the truck 5, after the gate 28 has been lifted, onto the lower end of the elevator 6, which can be properly adjusted by the cables 24.

The coal or other material then discharges from the upper end of the elevator 6 into the adjacent end of the horizontal conveyor 7 and is carried by the belt 34 over its discharge end and into a coal bin or onto a deposit pile.

Obviously, the outer end of the conveyor 7 (see Figure 1) may be adjusted so that the conveyor is substantially horizontal.

It is to be understood that the auxiliary conveyor 7 is especially useful in delivering coal to difficult places. Where the coal dump is conveniently located, the conveyor 7 may be substituted for, by a chute of any suitable type, or the elevator 6 alone, under certain circumstances.

The conveyor mechanism in the truck 5 is preferably removable and capable of being readily lifted by a suitable hoist when its displacement is desired.

The hopper 8 of the truck conveyor assembly is supported on the truck bed by legs 8a, or the usual side boards of the truck. The front end of the truck conveyor assembly (see Figure 1) is secured against displacement by hooks and eyes 5a, 5b, respectively. The hooks are preferably of the type employed in securing chain ends together. The vertically disposed chain 12 and its complemental sprocket wheels serve to retain the rear end of the truck conveyor assembly in place.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. In combination, a truck having a conveyor therein, an elevator at the discharge end of the truck and connected thereto below the conveyor, a horizontal conveyor, said conveyor in the truck being adapted to discharge material onto the elevator, said elevator being adapted to discharge material onto the horizontal conveyor, detachable flexible drive means between the truck conveyor and the horizontal conveyor, and means for elevating and lowering the said elevator.

2. In combination a truck having a conveyor therein, an elevator at the discharge end of the truck and pivoted thereto, said conveyor or truck being adapted to discharge material onto the elevator, a horizontal conveyor, said elevator being adapted to discharge material onto the horizontal conveyor, detachable flexible drive means between the truck conveyor and the horizontal conveyor, and flexible means for elevating and lowering said elevator.

JAMES W. SYMONDS.

REFERENCES CITED

The following references are of record in the file of this patent:

UNITED STATES PATENTS

| Number | Name | Date |
|---|---|---|
| 830,139 | Dowden | Sept. 4, 1906 |
| 1,135,073 | Swarner | Apr. 13, 1915 |
| 1,553,597 | Clark | Sept. 15, 1925 |
| 1,759,003 | Davidson | May 20, 1930 |
| 1,809,796 | Beardslet et al. | June 9, 1931 |
| 1,855,257 | Phillips | Apr. 26, 1932 |
| 2,182,139 | Speno | Dec. 5, 1939 |
| 2,320,667 | Smith | June 1, 1943 |
| 2,325,492 | Erickson | July 27, 1943 |
| 2,381,783 | Stevenson | Aug. 7, 1945 |
| 2,389,779 | Heller | Nov. 27, 1945 |
| 2,410,996 | Patterson | Nov. 12, 1946 |